United States Patent [19]

Benton et al.

[11] Patent Number: 5,172,251

[45] Date of Patent: Dec. 15, 1992

[54] THREE DIMENSIONAL DISPLAY SYSTEM

[75] Inventors: Stephen A. Benton, Lincoln, Mass.; Joel S. Kollin, Ann Arbor, Mich.

[73] Assignee: Massachusetts Institute of Technology, Cambridge, Mass.

[21] Appl. No.: 509,062

[22] Filed: Apr. 12, 1990

[51] Int. Cl.$^5$ .............................................. G03H 1/22
[52] U.S. Cl. .................................... 359/9; 359/11; 358/90
[58] Field of Search ...................... 350/3.6, 3.64, 3.66, 350/3.68, 358; 358/88, 90; 359/9, 11

[56] References Cited

U.S. PATENT DOCUMENTS

| | | | |
|---|---|---|---|
| 3,746,427 | 7/1973 | Foster | 350/358 |
| 3,856,986 | 12/1974 | Macovski | 358/90 |
| 4,265,517 | 5/1981 | Blair et al. | 350/358 |
| 4,295,145 | 10/1981 | Latta | 350/358 |
| 4,577,933 | 3/1986 | Yip et al. | 350/358 |
| 4,877,297 | 10/1989 | Yeh | 350/3.64 |

OTHER PUBLICATIONS

R. Fielding, "The Technique of Special Effects Cinematography," Chapter 9, pp. 224–244, Focal Press, 1965.

S. Benton, "Holographic Imaging Research at the M.I.T. Media Lab," Proceedings of the Third International Conference on Halographic Systems, Components and Applications, Edinburgh, Scotland, U.K., Sep. 16–18, 1991, I.E.E.

P. St. Hilaire et al., "Real-Time Holographic Display: Improvements Using a Multichannel Acousto-Optic Modulator and Holographic Optical Elements", SPIE Proceeding #1461, Practical Holography V, (SPIE, Bellingham, Wa., Feb. 1991).

S. Benton, "Experiments in Holographic Video Imaging," reprint from *Holography*, SPIE, vol. IS 8, 1991, pp. 247–267.

S. Benton, "Elements of Holographic Video Imaging," *Proceedings of the Fourth International Symposium on Display Holography*, (SPIE, Bellingham, Wa., 1992), pp. 1–13.

Kaneko, Toru, "One-Dimensional Hologram Recording Using an Acousto-Optic Deflector", *Electronics and Communications in Japan*, vol. 62-C, No. 4, 1979.

*Primary Examiner*—Bruce Y. Arnold
*Assistant Examiner*—J. P. Ryan
*Attorney, Agent, or Firm*—Hamilton, Brook, Smith & Reynolds

[57] ABSTRACT

A three dimensional display system includes a laser for generating a laser light signal. The signal is expanded and collimated using a traditional lens system and is directed to an acousto-optic modulator wherein it is modulated to generate a three dimensional image such as a holographic image. The modulation signal for the modulator is provided by a data processing system. The data processing system applies signals to the modulator that encode a diffraction pattern. The diffraction pattern is realized by the modulator upon application of the signals and the three dimensional image is produced by the modulated light signals. The image is demagnified by a demagnifier, and subsequently, imaged by a viewing lens. A horizontal scanner continuously multiplexes segments of the holographic image and compensates for the motion of segments across the modulator. A vertical scanner is provided to properly vertically position horizontal lines of the holographic image.

40 Claims, 6 Drawing Sheets

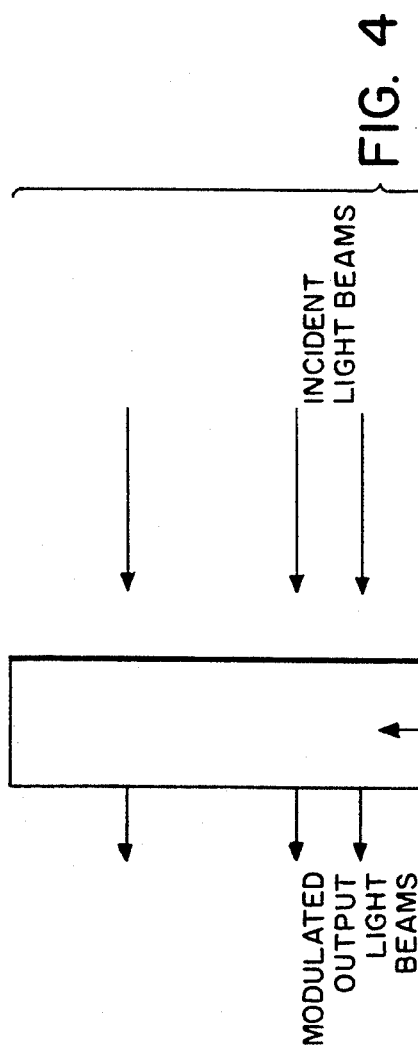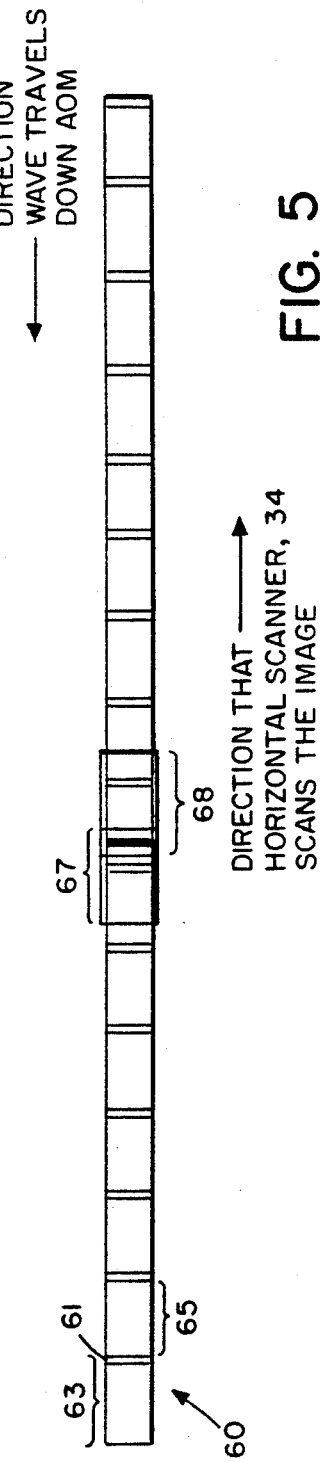

THREE DIMENSIONAL DISPLAY SYSTEM

BACKGROUND OF THE INVENTION

Holography is concerned with techniques for producing images, especially three dimensional images, by reconstructing wave fronts of light. In most holographic techniques, lasers are utilized to record a diffraction pattern on a photographic plate. This diffraction pattern is subsequently utilized to generate a three dimensional image. FIGS. 1a and 1b illustrate in more detail the recording of the diffraction pattern and the subsequent generation of a holographic image from the diffraction pattern, as typically performed in holographic techniques. In generating the diffraction pattern two beams of laser light are used: a reference beam 4 and an object beam 3. In most instances, both the object beam 3 and the reference beam 4 originate from a single laser source. The object beam 3 is directed to strike an object (FIG. 1a). Light from the object beam reflects off the object 1 and strikes the photographic plate 2 together with the reference beam 4. Because of the mutual degree of coherence between the object beam 3 and the reference beam 4, an interference pattern occurs on the plate 2 which is recorded by the photographic plate 2.

Once the interference pattern has been recorded on the photographic plate 2, the plate 2 is developed using traditional photographic techniques. Subsequent to development of the photographic plate, a holographic image may be generated by shining a reconstruction beam 8 (i.e. the reference beam 4) through the plate 2 as shown in FIG. 1b. As the reconstruction beam 8 passes through the holographic plate 2, it is diffracted by the recorded interference pattern now described as a generalized diffraction grating and generates a virtual image 9 of the object that is visible to a viewer 7. Thus, the viewer 7 is given the illusion of actually seeing the object.

The above description represents just one of the many techniques for generating holographic images. The basic concepts elaborated with respect to that technique, however, are equally applicable to other approaches of generating such images.

Attempts at real time three dimensional holographic display systems have been plagued with bandwidth and display technology problems. In particular, the necessary bandwidth of information required to produce holographic images has been too great for current processing capabilities. For instance, a hologram of dimensions 100 millimeters by 100 millimeters and a viewing angle of 30 degrees contains approximately 25 gigabytes of information. This is the equivalent of 25 billion samples of information. Moreover, in order to update such an image with 8 bit resolution at rate of 60 frames per second, a data rate of 12 terabits/seconds is required for transmission of the hologram. These tremendous bandwidth and processing requirements are far beyond current capabilities.

SUMMARY OF THE INVENTION

In accordance with the present invention, a three dimensional display system is comprised of an acousto-optic modulator for generating a generalized diffraction grating which corresponds with a three dimensional image. The acousto-optic modulator preferably comprises a $TeO_2$ crystal. A light source is used to provide light signals that are directed to pass through the diffraction grating. Light passing through the diffraction grating is thus modulated and is subsequently demagnified. The demagnification serves to increase the angle of view of the image of the grating. An aerial image is visible through a viewing lens. The three dimensional images produced by this system are preferably holographic images. Moreover these images may be generated in real time.

In accordance with an embodiment of the present invention, a data processing system generates electrical signals that encode a three dimensional hologram. The electrical signals are sent from the data processing system to an acousto-optic modulator that converts the electrical signals into corresponding acoustical signals. The basic process of encoding and generating the holograms in the electrical signals is discussed in John S. Underkoffler, "Development of Parallel Processing Algorithms for Real-Time Computer Holography", Baccalaureate Thesis. Massachusetts Institute of Technology, May 1988. These acoustic signals drive the acousto-optic modulator.

Ideally, the hologram generated by the data processing would be forwarded to the acousto optic modulator a horizontal line at a time. Unfortunately, practical considerations limit the ability to send a horizontal line of the hologram in a single step to the modulator. One of the primary limitations is the significant amount of data that is contained in a horizontal line of a hologram. For the present invention, each horizontal line contains 32,000 pixels of video information. As such, video frame buffers that transmit 32,000 pixels at a time are not available. To overcome this complication, the present invention uses a frame buffer that forwards segments of 2,000 pixels of video information at a time and forwards the horizontal line as 16 segments of 2,000 pixels each. The frame buffer holds 64 such horizontal lines. These segments are sent consecutively to form a roughly continuous stream of signals.

A further complication to the large amount of information that needs to be transferred is the size of the acousto-optic modulator. The modulator used in the present invention is only large enough to transfer 2,000 fringes along its length (roughly corresponding to 4,000 pixels). To overcome this problem, a horizontal scanner is provided that scans or translates the image of the output from the modulator. In particular, the acoustic signals for an entire horizontal line of a hologram are continuously pumped through the acousto optic modulator. The acoustic signals travel down the modulator in one direction while a horizontal scanner scans the image of the output of the modulator in the opposite direction. The horizontal scanner is synchronized with the speed of the acoustic signals so that scanned portions of the output image appear stationary in the resulting holographic image. By operating in this manner, the modulator is used to produce 32,000 pixels during a single scan as opposed to only 4,000 pixels.

Since the hologram is forwarded a horizontal line at a time in segments to the modulator, it also is necessary to have a vertical scanner to appropriately position the horizontal lines of the holographic image in the vertical plane. The vertical scanner determines where in the holographic image a current horizontal line should be placed. A suitable vertical scanner is a galvanometric scanner.

It is preferred that the light source used in the display system be a laser light source. The suitable laser light source, such as a HeNe laser, preferably emits a monochromatic light signal. To minimize the information content of the holographic image and, thus, to decrease processing requirements, the vertical parallax is removed from the hologram. It is also preferred that the hologram be comprised of distinct luminous points defining surfaces that exhibit occlusion effects to provide depth cues to viewers of the holographic image. The hologram is preferably displayed within a field of view of at least 15 degrees to allow for lateral movement of two eyes scanned about 2.5 inches apart while providing sufficient image resolution.

BRIEF DESCRIPTION OF THE DRAWINGS

FIG. 4 illustrates the acousto-optic modulator.

FIG. 5 shows windows corresponding to the scanned image of the acousto-optic modulator relative to a horizontal line of the holographic image.

DETAILED DESCRIPTION OF THE PREFERRED EMBODIMENT

In accordance with a preferred embodiment of the present invention, a hologram stored in a data processing system has significantly less information content than holograms known in the prior art. Most holograms carry far more information than a viewer can ever discern, and such holograms can be streamlined of their large information content without affecting the visual impact of the holograms. The changes employed by the present invention to reduce the information content of a hologram include not computing the vertical parallax in the hologram. Parallax refers to an apparent change in the direction of an object that results from a change in observational position having a new line of sight. The elimination of the vertical parallax decreases the computational requirements and information content of the holograms by several orders of magnitude. Second, the viewing field for the holographic image is limited to 15 degrees. This corresponds to at least two standard eye spacings (approximately 2.5 inches at a distance of 20 inches) and should be sufficient for one viewer to readily see the image. Larger fields of view require much more information content and are not generally needed for a single viewer to adequately see the holographic image. Third, the resolution of the image is decreased to the limit of resolution of the data. For example, resolution can be reduced to 64 vertical lines of resolution. This corresponds to an information content of 2 megabytes per frame or approximately 1 gigabit/second which is well within current capabilities. These three changes to the hologram make the information content of the hologram manageable.

The apparatus for displaying the three dimensional holographic images is comprised of two parts: an electrical part and an optical part. There is some overlap between these two parts, and they do not function in isolation from each other; rather, they interact to produce the holographic image.

Figure 1A:
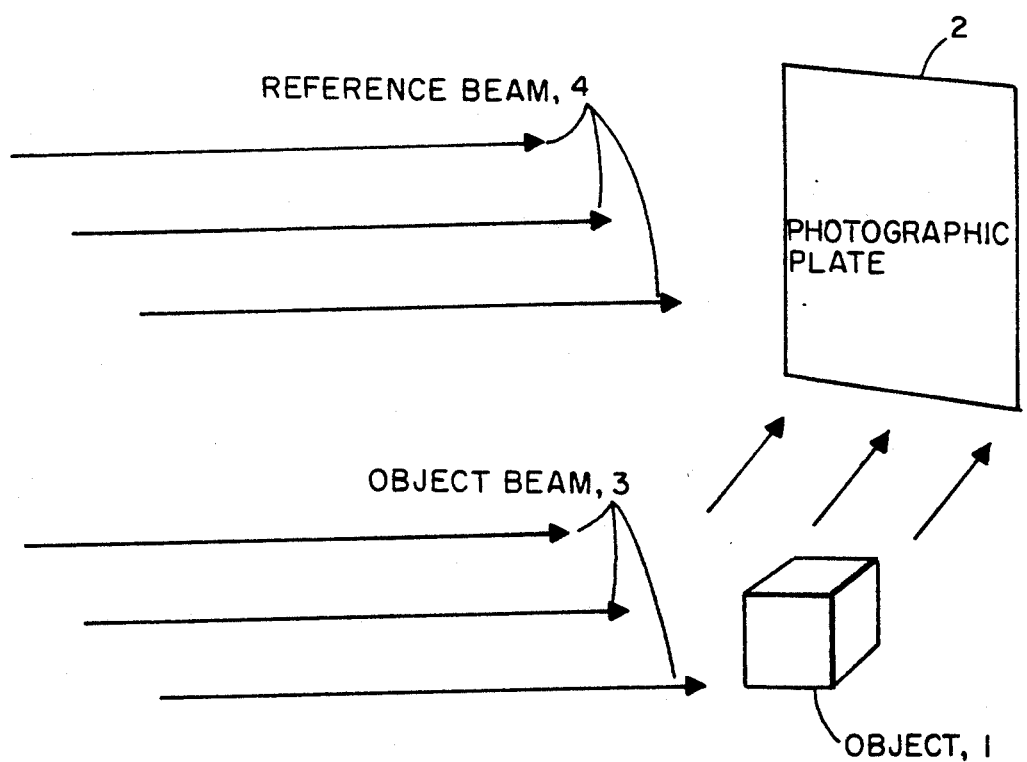
FIGS. 1a and 1b illustrate basic techniques for generating a hologram and holographic image.
Figure 1B:
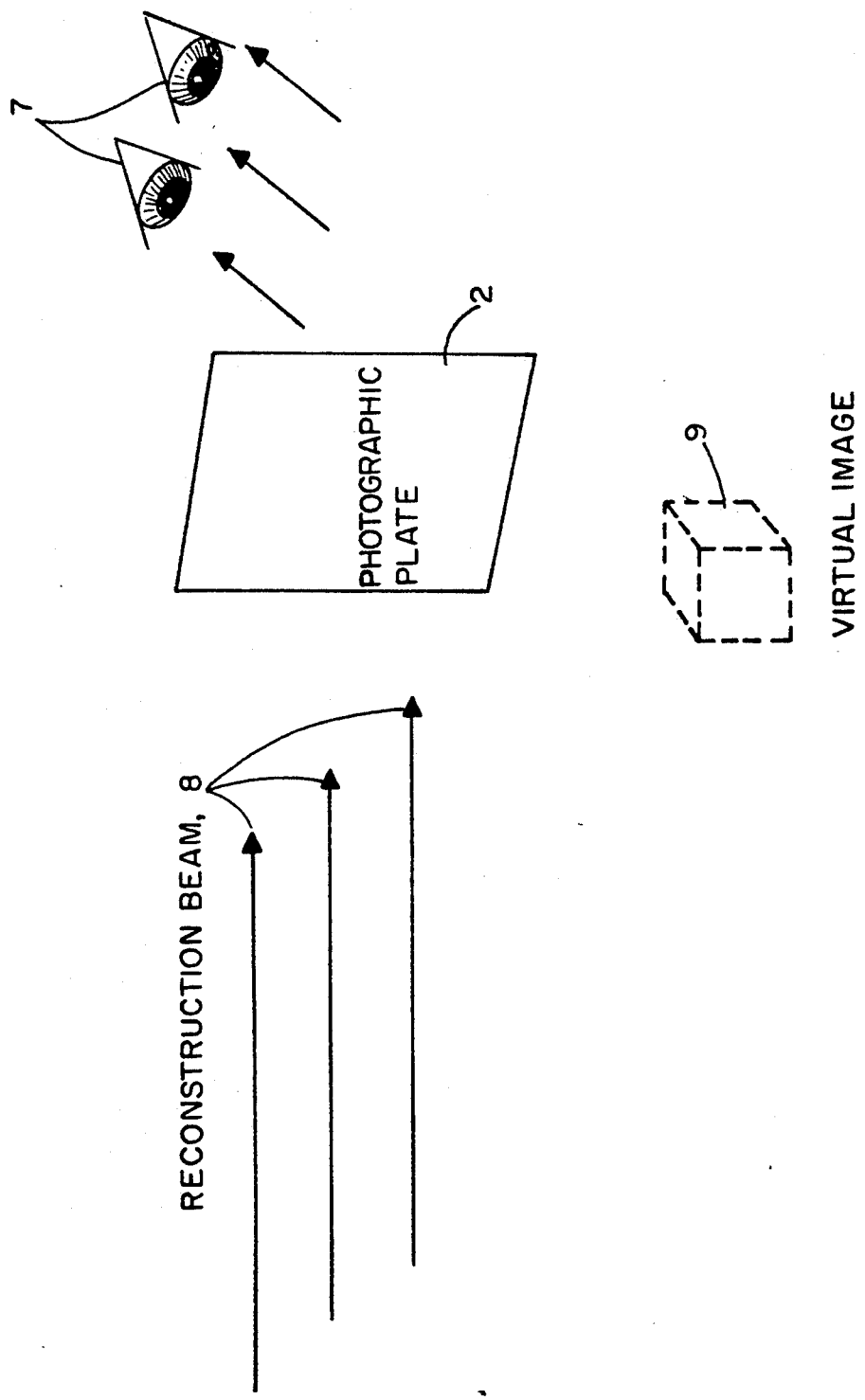
Figure 2:
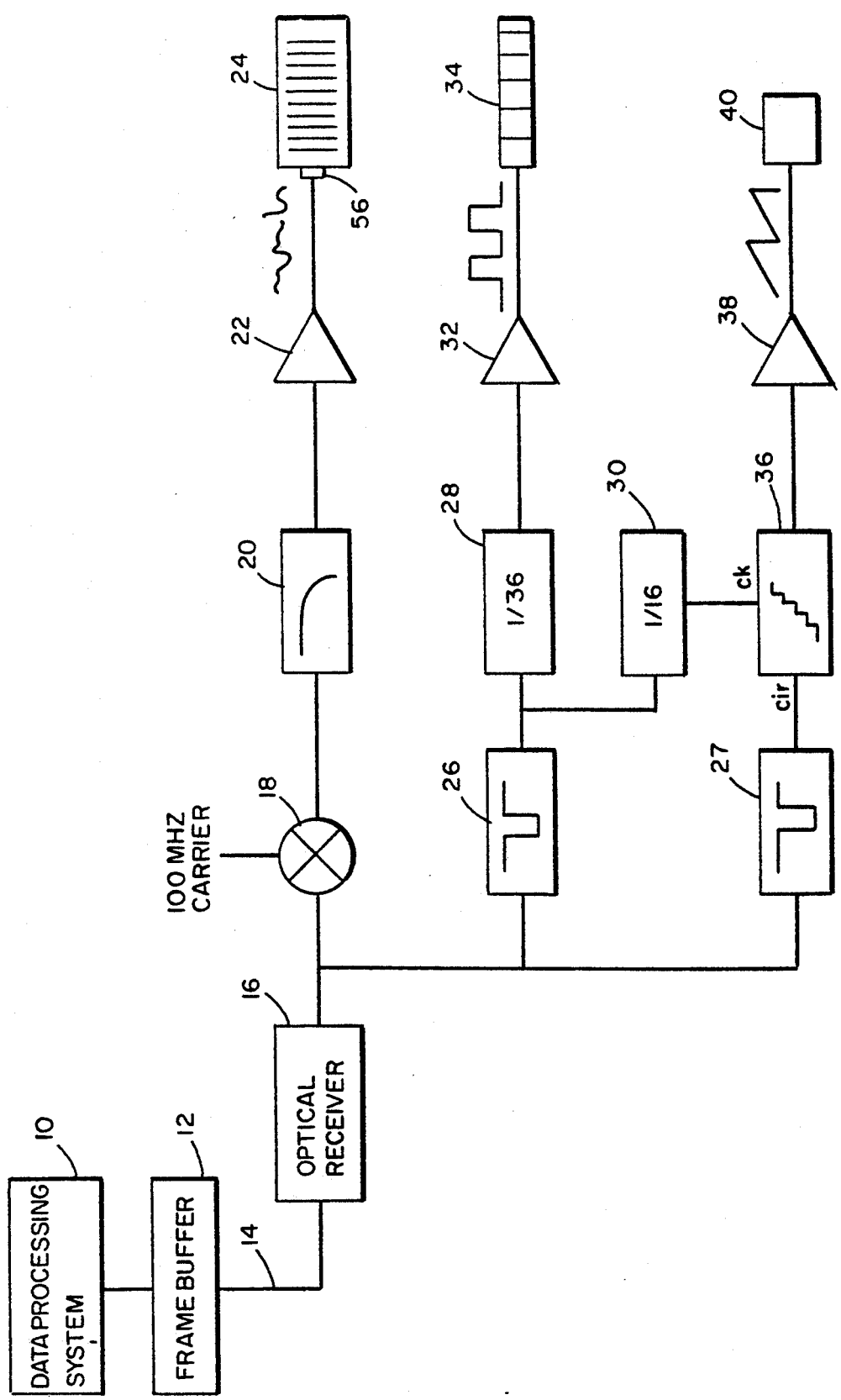
FIG. 2 shows the electrical portion of the holographic display system.

FIG. 2 shows the components of the electrical part of the holographic display system. A data processing system 10 is used to calculate the hologram that produces the holographic image. A suitable data processing system is the model 2 of The Connection Machine (CM2) produced by Thinking Machines Corporation in Cambridge, Mass. This data processing system has 16,000 microprocessors organized into a massively parallel hypercube architecture. The data processing system 10 is used to calculate individual pixel segments of the hologram in sequence until all of the pixel segments of the hologram have been calculated. After each segment of 2,000 pixels is calculated, the data processing system 10 sends a series of sinusoidal variations for the segment which are loaded into the frame buffer 12. The sinusoidal variations for a given segment encode a portion of the diffraction pattern which directly corresponds to the hologram. The holograms encoded in this pattern produce holographic images that are comprised of discrete points of light that define surfaces that exhibit occlusion effects to aid the viewer in perceiving depth in the holographic image.

The frame buffer 12 reads out pixels and then segments of the hologram in sequence. There are 64 horizontal lines in each hologram, and each horizontal line comprises 32,000 pixels or data points. Each horizontal line of the hologram is comprised of 16 segments of 2K video pixels that are spliced together. Given that the frame buffer 12 can only forward 2K pixels at a time, it is evident that a horizontal line of the hologram is generated by sending a sequence of 16 segments from the frame buffer. As such, the structure of the frame buffer 12 (i.e. being able to only forward a segment at a time) mandates the need for generating each horizontal line of the hologram as a sequence of segments.

Each transmission signal stored in the frame buffer 12 is comprised of a 55 megahertz bandwidth video signal. Each transmission signal is sent down a fiber optic link 14 to an optical receiver 16. The optical receiver 16, in turn, sends the transmission video signal to display electronics via coaxial cables In particular, the video signal is sent to a mixer 18 that mixes the video signal with a 100 megahertz carrier signal. The mixed signal is then passed through a low pass filter that filters out all of the mixed signal other than the lower sideband. The resulting signal is in the proper frequency range for the acousto-optic modulator 24: 45-100 megahertz. Once the signal has been filtered by the low pass filter 20, it is amplified by an amplifier 22 and applied as a drive signal to the acousto-optic modulator 24. The operation of the acousto-optic modulator and its significance are detailed below. Likewise, the remaining electronics in FIG. 2 that have not been discussed are discussed below. This discussion is deferred because it is necessary to understand operation of the optical portion of the system before one can understand these electronics.

Figure 3B:
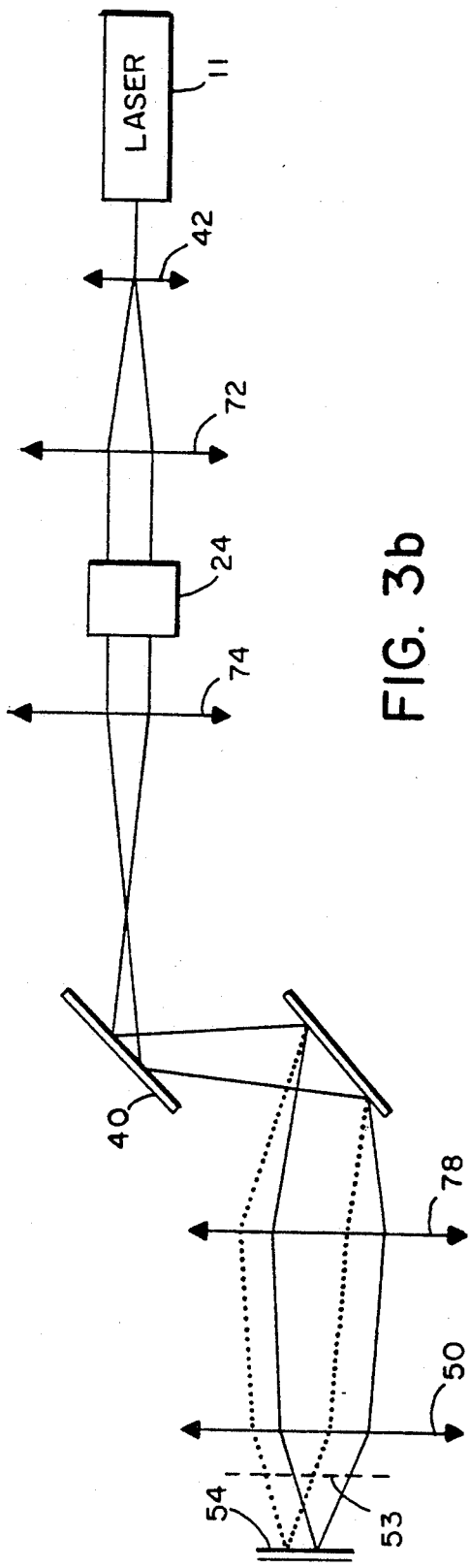
FIG. 3b depicts a side view of the vertical scanning optics.
Figure 3A:
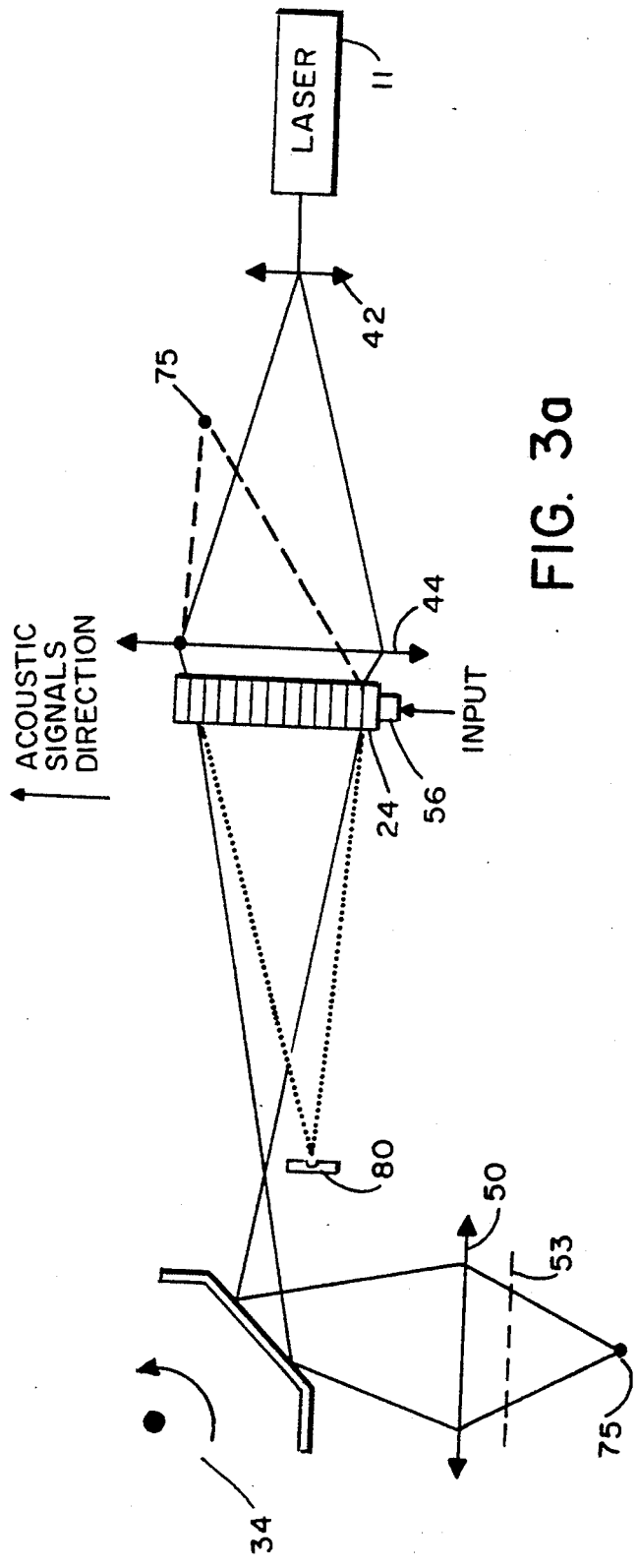
FIG. 3a depicts a plan view of the horizontal scanning optics.

FIGS. 3a and 3b illustrate the optical portions of the holographic display system. For purposes of clarity, FIG. 3a shows the horizontal scanning portion of the system without the vertical scanning optics. FIG. 3b, on the other hand, illustrates the vertical scanning optics without the horizontal scanning optics. It should be born in mind that all of the components in these two figures are contained in the preferred embodiment. They are separated in this manner because illustration of them together in one figure would be extremely confusing.

FIG. 3a shows the acousto-optic modulator 24. The acousto-optic modulator 24 acts as a diffraction grating upon which incident light from a laser 11 is diffracted. In essence, the acousto-optic modulator 24 acts as a hologram, for the diffraction grating produced by the acousto-optic modulator 24 is an encoding of the hologram generated by the data processing system 10 (FIG. 2). As mentioned previously, the data processing system 10 computes the appropriate diffraction pattern to generate the desired hologram. This diffraction pattern is passed via the electronics depicted in FIG. 2 and applied to the acousto-optic modulator 24.

FIG. 4 shows the acousto-optic modulator 24. The body of the modulator 24 is comprised of a $TeO_2$ (tellurium dioxide) crystal. On one end of the modulator 24 is an ultrasonic transducer 56. The ultrasonic transducer receives the mixed electrical signals from the optical receiver 16 (i.e. the mixed and filtered video signals in FIG. 2) and converts the drive signals into appropriate acoustic signals These acoustic signals are launched down the $TeO_2$ crystal in the direction of the arrow 21 shown in FIG. 4 pointing along and up the crystal. As the acoustic wave propogates along the crystal, regions of electric shear in the wave modulate the index of refraction tensor of the crystal. The modulation in the index of refraction results in modulation of the incident polarized light beams. In particular, the optical beams emerge from the crystal with a relative phase difference pattern along the length of the crystal that is proportional to the amplitude of the applied acoustic wave. As such, the acousto-optic modulator 24 transfers the computer generated hologram into the optical beam that exits the modulator 24.

The modulator 24 has a length of approximately 35 millimeters, and it takes 40 microseconds for the acoustic wave to travel down the length of the crystal The operating bandwidth of the modulator is in the range of 45 to 95 megahertz.

The acousto optic modulator 24 (FIG. 3a) is utilized in the optical portion of the apparatus to generate the resulting holographic image. In particular, a laser light source emits coherent light towards the acousto-optic modulator 24. It is preferred that a 10 mW HeMe laser is utilized to emit monochromatic red light having a wave length of 632.8 nanometers. The use of a monochromatic light source limits the holographic image to a single color. If one desires multiple colors, multiple-colored light sources may be used. The light emitted from the laser 11 is expanded in the horizontal plane through use of a cylindrical lens 42. Expanded light then passes through a lens 44 that in combination with lens 50 acts like an inverted telescope to demagnify the output from the modulator 24 in the horizontal plane of image plane 53 which is the vertical and horizontal image plane of the acousto-optic modulator. The demagnification is needed because the modulated light that exits the modulator 24 has a total angle of diffraction of approximately 3 degrees. The output from the modulator 24 is demagnified on the order of 5 times by lenses 44 and 50 to increase the horizontal angle of view to 15 degrees in the horizontal direction. The light passing through lens 44 enters the modulator 24 in slightly convergent form.

It must be appreciated that due to limitation of the frame buffer 12 and the acousto-optic modulator 24, an entire horizontal line of the hologram cannot be forwarded as a single transaction to the modulator 24 to produce a resulting horizontal line of the holographic images. Rather, as previously mentioned, segments of 2,000 pixels of the desired holographic image are sent from the segment buffer 12 in sequence. In particular, segments for each horizontal line of the hologram are sent beginning with the uppermost left-hand corner of the image and then are loaded in sequence proceeding along a horizontal line until the end of a horizontal line of the image is reached. When the end of a horizontal line is reached, the next horizontal line of the image is sent from the frame buffer 12 beginning with the leftmost slice. The signals for the 16 segments are not sent in individual discrete steps to the acousto-optic modulator; instead, they are sent as a continuous sequential stream to the modulator 24. The resulting output is scanned by the horizontal scanner 34 to gather the pixels for an entire horizontal line of the holographic image.

The horizontal scanner 34 serves two primary purposes. First, since the fringes generated in response to the acoustic signal travel along with the acoustic signal, the diffracted image moves across the face of the modulator 24. The holographic image would, thus, appear to move across the image 53 absent some correction. The horizontal scanner 34 freezes this motion by being synchronized with the rate of propagation of the acoustic signal. The horizontal scanner 34 also serves the added purpose of multiplexing segments from the acousto-optic modulator 24. The multiplexing is necessary because the crystal can only hold 2,000 fringes at a time and therefore, cannot produce at once an entire horizontal line of the holographic image. The horizontal line of the hologram is comprised of 32,000 pixels; thus, 16 segments must be positioned on a given line of the holographic image. The horizontal scanner 34 scans the image 53 at the face of the acousto-optic modulator 24 as the signals for the entire horizontal line of the hologram are continuously passed across the modulator 24 as a sequence. It scans in a direction opposite to the direction of propagation of the fringes and is synchronized with the movement of the fringes so that all 32,000 pixels of a horizontal line can be gathered from a single scan of the modulator 24 face at the image 53.

Figure 6B:
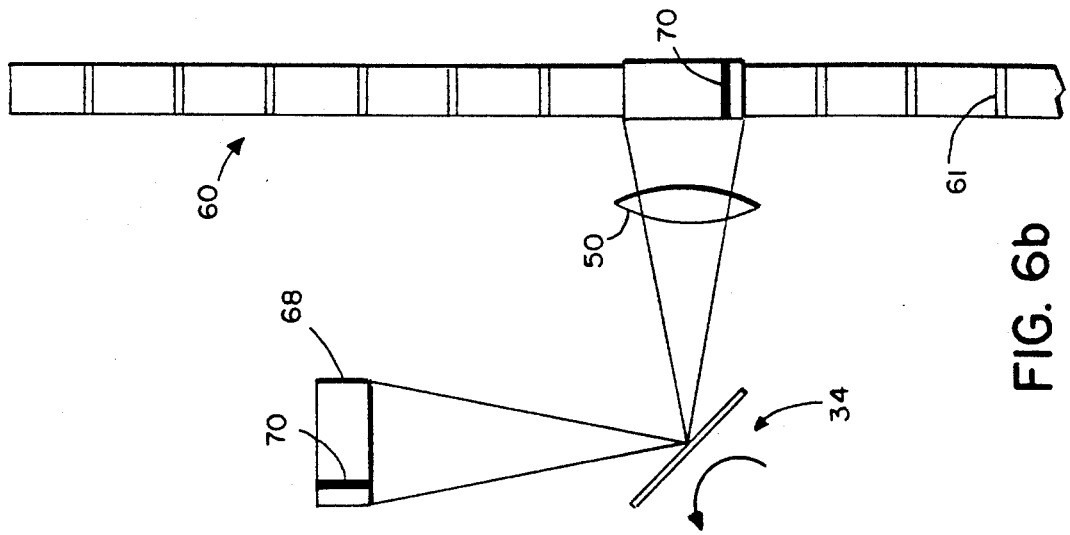
FIGS. 6a and 6b depict examples of how the scanner scans a horizontal line of the holographic image.
Figure 6A:
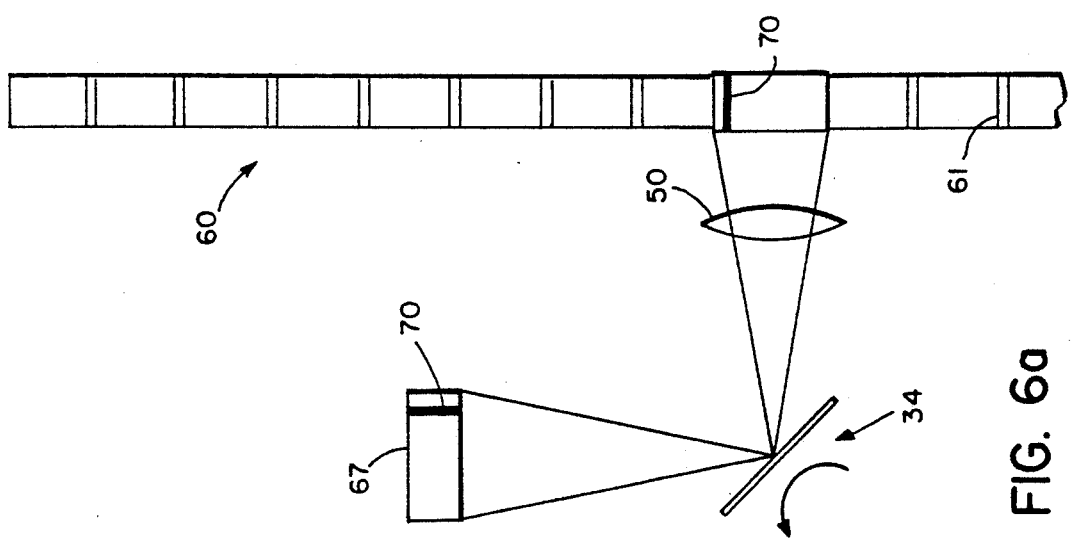

FIGS. 5, 6a and 6b help illustrate how the horizontal scanner performs its two functions. FIG. 5 illustrates a line 60 of the demagnified and scanned image of the acousto-optic modulator 53. The fringes in the holographic line 60 are produced by the modulator in sequence as the signals from the frame buffer 12 (FIG. 2) are forwarded to the modulator 24. The light diffracted by the modulator (i.e. the holographic output) is reflected by the horizontal scanner 34 to the horizontal line of the holographic image 53. For example, as the acoustic signal for the first segment 63 is applied to acousto-optic modulator, the fringes for that portion of the holographic image are produced. The fringes move across the modulator 24, but since the horizontal scanner 34 alters the angle of reflection of the fringes relative to the viewing point to compensate for this motion, the fringes appear stationary. Moreover, as the acoustic signals for the second segment 65 begin to enter the modulator, the scanner 34 reflects their fringes and keeps their fringes stationary also. The rotation of the scanner 34 is such that the fringes for the second segment 65 are spliced together with the fringes of the first segment 63 in the holographic image. Unfortunately, the frame buffer 12 generally includes an interval between segments during which the signal from buffer 12 is blanked. As such, blanks 61 appear in the holographic image between adjacent segments.

The operation of the horizontal scanner is perhaps better understood with reference to FIGS. 6a and 6b. These figures illustrate operation of the scanner relative to acousto-optic modulator images 67 and 68. The images 67 and 68 represent the image of the modulator face scanned by the horizontal scanner 34 for different points in time during the horizontal scanning process. As the wave travels from right-to-left relative to FIGS. 5, 6a and 6b, a fringe 70 moves from right to left. This movement is noted in FIGS. 6a and 6b by the shift of the fringe 70 from right-to-left in the acousto-optic images 67 and 68. As the fringe shifts, the horizontal scanner 34 rotates to present a different angle of reflection. The change in angle of reflection compensates for the movement of the fringe, so that the fringe does not move in the horizontal line 60 of the holographic image. What moves relative to the horizontal line 60 is the portion being scanned by the horizontal scanner 34.

Synchronization and multiplexing may be expressed more formally. In the simplest case, the relationship relating the angular speed of the polygon ω, the speed of sound on the crystal v and the distance between the acousto-optic modulator and the mirror face L is given by:

$$\omega = v/2L.$$

FIG. 3a shows the light from the acousto-optic modulator 24 being reflected by the horizontal scanner to a field lens 50. As mentioned above, the field lens 50 works in conjunction with the lens 44 to demagnify the holographic image to increase the horizontal field of view of the image. A 55 mm f/1.2 camera lens is appropriate to implement this lens 50. The resulting field curvature attributable to the lens 50 is small enough to be hardly noticeable. The image of this diffraction grating of the acousto-optic modulator is formed at plane 53. The image point 75i in FIG. 3a shows an image of a single virtual object point 75 in the holographic field generated by the hologram.

Because the video signals sent to the modulator 24 are mixed with a carrier signal, portions of the interference grating induced at the modulator 24 are attributable to the carrier signal. The light diffracted by the carrier fringes will be at a angle different from the holographic information itself. To prevent the carrier diffraction from propagating any further, a carrier stop 80 is provided.

FIG. 3b depicts the vertical scanning optics of the system. The light signals sent from the laser 11 are expanded by lens 42 in the vertical plane. This lens also expands the light in the horizontal plane as mentioned above. Lens 72 then collimates the light in the vertical plane. Lens 74 is used to provide expansion in the vertical field of view of the holographic image. After passing through lens 74, the light enters a galvanometric scanner 40 used in a telecentric configuration with lenses 78 and 50. The galvanometric scanner 40 positions the light vertically on the horizontal scanner 34 so that the horizontal lines of the diffraction grating image are properly positioned in the vertical plane 53. Lens 78 compensates for the angular deflection of the galvanometric scanner 40 to give parallel deflection. Lastly, lens 50 operates to image the holographic image onto the vertical holographic image plane 54.

Given the above discussion of the optical position, one can now appreciate the electrical components of the system in FIG. 2 which were not previously discussed. In particular, a horizontal synchronization signal and a vertical synchronization signal 27 are modulated into the video signals sent from the segment buffer. These signals are typical of those known in the art for video displays. The horizontal signal is divided into a 1/36 signal 28 that is sent once every 36 segments for use by the horizontal scanner 34. The 1/36 factor is determined by the particular horizontal scanner hardware. The other portion 30 of the horizontal signal (i.e. 1/16) clocks a counter and digital-to-analog converter 36. This portion 30 of the horizontal signal 26 is denoted 1/16 because it clocks the counter and digital-to-analog converter every 16 segments (i.e. every 16 segment buffers) so that a new vertical position is realized by the galvanometric scanner 40 with each complete horizontal line of the holographic image. The clocked signal passes through a driver 38 to the galvanometric scanner 40. The counter and digital-to-analog converter 36 is cleared by the vertical synchronization signal 27 that issues after the last signal of a hologram is transmitted.

As mentioned previously the holographic image seen by the viewer need not be static. Rather, it may be manipulated by the data processing system to generate animation. It may also be manipulated by certain transformations to instill rotational motion and other known transformations. All such transformations may be performed in real time.

While the invention has been particularly shown and described with reference to preferred embodiments thereof, it will be understood by those skilled in the art that various changes in form and details may be made without departing from the spirit and scope of the invention as defined in appended claims.

We claim:

1. A three dimensional display system, comprising:
    a) a modulator generating a diffraction grating corresponding to a three dimensional image;
    b) a light source providing light signals that pass through the diffraction grating created at the modulator to generate modulated light signals;
    c) demagnifying means demagnifying the modulated light signals from the modulator;
    d) optics which aerially image the demagnified modulated light signals to display for viewing the three dimensional image produced by the demagnified output; and
    e) a data processing system coupled to the acousto-optic modulator for dictating the diffraction pattern generated by the modulator.

2. A three dimensional display system as recited in claim 1 wherein the three dimensional image is a holographic image.

3. A three dimensional display system as recited in claim 1 wherein the light source is a laser light source.

4. A three dimensional display system, comprising:
    a) a modulator generating a diffraction grating corresponding to a three dimensional image;
    b) a light source providing light signals that pass through the diffraction grating created at the modulator to generate modulated light signals;
    c) demagnifying means demagnifying the modulated light signals from the modulatpr;
    d) optics which aerially image the demagnified modulated light signals to display for viewing the three dimensional image produced by the demagnified output; and e) horizontal scanning optics for scanning the modulator output to continuously splice together horizontal segments of the three dimensional image.

5. A three dimensional display system, comprising:
a) a modulator for generating a diffraction grating corresponding to a three dimensional image;
b) a light source providing light signals that pass through the diffraction grating created at the modulator to generate modulated light signals;
c) a demagnifying means for demagnifying the modulated light signals from the modulatpr;
d) an imaging lens for aerially imaging the demagnified output to view the three dimensional image produced by the demagnified output;
e) horizontal scanning optics for scanning the modulator output to continuously splice together horizontal segments of the three dimensional image; and
f) vertical scanning optic means for vertically positioning the output of the modulator in the three dimensional image.

6. A holographic display system, comprising:
a) a laser light source providing laser light signals;
b) a data processing system providing electrical signals that encode a hologram which lacks vertical parallax;
c) an acoustic-optic modulator converting the electrical signals into corresponding acoustic signals and generating a diffraction pattern correlating to the hologram using the acoustic signals such that a three dimensional holographic image is generated by the laser light signals as they pass through the modulator;
d) a demagnifier for demagnifying the holographic image generated by the acoustic-optic modulator; and
e) optics displaying the demagnified holographic image light signals from the modulator, the displayed holographic image being an aerial image for viewing of a three dimensional image.

7. A holographic display system as recited in claim 6 wherein the acousto-optic modulator comprises a TeO$_2$ crystal.

8. A holographic display system as recited in claim 6 wherein the laser light source emits monochromatic laser light signals.

9. A holographic display system, comprising:
a) a laser light source providing laser light signals;
b) a data processing system providing electrical signals that encode a hologram;
c) an acoustic-optic modulator converting the electrical signals into corresponding acoustic signals and generating a diffraction pattern correlating to the hologram using the acoustic signals such that a three dimensional holographic image is generated by the laser light signals as they pass through the modulator;
d) a demagnifier for demagnifying the holographic image generated by the acousto-optic modulator; and
e) optics displaying the demagnified holographic image light signals from the modulator, the displayed holographic image being an aerial image for viewing of a three dimensional image, wherein field of view of the holographic image is at least 15 degrees.

10. A holographic display system, comprising:
a) a laser light source for supplying laser light;
b) a data processing system for providing a sequence of electrical signals that encode a hologram;
c) a transducer for converting the sequence of electrical signals into a sequence of corresponding acoustic signals;
d) an acousto-optic modulator for receiving the laser light and modulating the laser light by applying each of the acoustic signals in sequence from the transducer across a medium through which the light signals pass to produce a sequence of segments of a holographic image;
e) a demagnifier for demagnifying the segments of the holographic image output in sequence by the acousto-optic modulator;
f) a horizontal scanner synchronized with the acousto-optic modulator for scanning the acousto-optic modulator to sequentially and continuously splice the segments of the holographic image output from the acousto optic modulator in proper horizontal positions in the holographic image;
g) a vertical scanner synchronized with the horizontal scanner and the acousto-optic modulator for positioning the slices of the holographic image output from the acousto-optic modulator in proper vertical positions in the holographic image; and
h) a viewing lens for aerially viewing the holographic image.

11. A holographic display system as recited in claim 10 wherein the horizontal scanner is a revolving polygonal mirror.

12. A holographic display system as recited in claim 10 wherein the vertical scanner is a galvanometric scanner.

13. A holographic display system as recited in claim 10 wherein the acousto-optic modulator comprises a TeO$_2$ crystal.

14. A holographic display system as recited in claim 10 wherein the laser emits monochromatic laser light signals.

15. A holographic display system as recited in claim 10 wherein the laser source HeNe laser.

16. A holographic display system as recited in claim 10 wherein the holographic image is a three dimensional image.

17. A holographic display system as recited in claim 10 wherein the data processing system is programmed such that the holographic image is viewed as moving in the viewing lens.

18. A holographic display system as recited in claim 10 wherein the hologram provided by the data processing system is such that the holographic image is composed of distinct luminous points.

19. A holographic display system as recited in claim 10 wherein the hologram provided by the data processing system is such that the holographic image exhibits occlusion effects.

20. A holographic display as recited in claim 10 wherein the laser source is a continuous laser source.

21. A method of three dimensional imaging, comprising the steps of:
a) shining light signals from a light source onto an acousto-optic modulator;
b) applying acoustic signals across an acousto-optic modulator to produce changes in indexes of refraction of portions of the modulator through which the light signals pass such that the light signals are modulated in the modulator to generate a resulting three dimensional image;

c) demagnifying the three dimensional image to increase an angle of diffraction of the image;
d) vertically scanning the modulated light; and
e) viewing the three dimensional image light signals from the modulator using a viewing lens.

22. A method as recited in claim 21 wherein the three dimensional image is a holographic image.

23. A method of displaying a holographic image, comprising the steps of:
a) providing electrical signals from a data processing system that encode a hologram;
b) converting the electrical signals to corresponding acoustic signals;
c) applying the acoustic signals across an acousto-optic modulator to alter indexes of refraction at points of the acousto-optic modulator;
d) shining a laser beam through the acousto-optic modulator to produce a holographic image that is generated by modulation of the light beam due to alteration of the indexes of refraction of points of the acousto-optic modulator;
e) vertically scanning the modulated light;
f) demagnifying the holographic image with a demagnifier; and
g) aerially viewing the demagnified holographic image light from the modulator through a viewing lens.

24. A method of holographic display, comprising the steps of:
a) providing a sequence of electrical signals from a data processing system that encode portions of a hologram;
b) converting each of the electrical signals in the sequence into corresponding acoustic signals;
c) applying sequentially each of the acoustic signals across an acousto-optic modulator to alter indexes of refraction at points of the acousto-optic modulator;
d) shining a laser beam through the acousto-optic modulator to produce for each acoustic signal a segment of the holographic image that is generated by modulation of the laser beam induced by the alteration of the indexes of refraction of points of the acousto-optic modulator;
e) demagnifying each resulting slice of the holographic image;
f) horizontally splicing each segment of the holographic image in a proper horizontal position using a horizontal scanning means;
g) vertically positioning each slice of the holographic image using a vertical positioning means; and
h) viewing the demagnified holographic image light from the modulator through a viewing lens.

25. A holographic display system, comprising:
a) a laser light source for providing laser light signals;
b) a data processing system for providing electrical signals that encode a hologram;
c) an acousto-optical modulator for converting the electrical signals into corresponding acoustic signals and for generating a diffraction pattern correlating to the hologram using the acoustic signals such that a holographic image is generated by the laser light signals as they pass through the modulator;
d) a demagnifier for demagnifying the holographic image generated by the acousto-optic modulator; and e) a viewing lens for aerially viewing the holographic image with a field of view of at least 15°.

26. A holographic display system as claimed in claim 25 further comprising vertical scanning optics for vertically positioning the output of the modulator in a three-dimensional image.

27. A three dimensional display apparatus comprising:
a modulator generating a holographic diffraction pattern corresponding to a three dimensional image;
a light source providing light signals that pass through the diffraction grating generated at the modulator to generate modulated light signals; and
optics imaging the modulated light signals to display for viewing a three dimensional image, the three dimensional image being an aerial image having a field of view of at least 15°.

28. A three dimensional display system as recited in claim 27 further comprising a demagnifier for demagnifying the modulated light signals.

29. A three dimensional display system as recited in claim 27 wherein the modulator is an electrically driven acousto-optic modulator.

30. A three dimensional display apparatus comprising:
a modulator generating a holographic diffraction pattern corresponding to a three dimensional image;
a light source providing light signals that pass through the diffraction grating generated at the modulator to generate modulated light signals;
optics imaging the modulated light signals to display for viewing a three dimensional image, the three dimensional image being an aerial image; and
vertical scanning optics for vertically positioning the output of the modulator in the three dimensional image.

31. A three dimensional display as recited in claim 30 further comprising horizontal scanning optics for scanning the modulator output to continuously splice together horizontal segments of the three dimensional display.

32. A three dimensional display apparatus comprising:
a modulator generating a holographic diffraction pattern corresponding to a three dimensional image which lacks vertical parallax;
a light source providing light signals that pass through the diffraction grating generated at the modulator to generate modulated light signals; and
optics imaging the modulated light signals to display for viewing a three dimensional image, the three dimensional image being an aerial image.

33. A method of displaying a three dimensional image comprising:
electro-optically generating a holographic diffraction pattern which lacks vertical parallax;
modulating a light source with the holographic diffraction pattern; and
aerially imaging the modulated light to provide a three dimensional display for viewing.

34. A method as recited in claim 33 further comprising the step of demagnifying the modulated light.

35. A method as recited in claim 33 wherein a holographic diffraction pattern is generated in an acousto-optic modulator.

36. A method of displaying a three dimensional image comprising:
   electro-optically generating a holographic diffraction pattern;
   modulating a light source with the holographic diffraction pattern;
   aerially imaging the modulated light to provide a three dimensional display for viewing; and
   vertically scanning the modulated light.

37. A method as recited in claim 36 further comprising horizontally scanning the modulated light to continuously splice together horizontal segments of the three dimensional image.

38. A method of displaying a three dimensional image comprising:
   electro-optically generating a holographic diffraction pattern;
   modulating a light source with the holographic diffraction pattern; and
   aerially imaging the modulated light to provide a three dimensional display for viewing, the field of view of the three dimensional image being at least 15°.

39. A three-dimensional display system comprising:
   a) a modulator generating a diffraction grating corresponding to a three dimensional image;
   b) a light source providing light signals that pass through the diffraction grating created at the modulator to generate modulated light signals;
   c) demagnifying means demagnifying the modulated light signals from the modulator;
   d) optics which aerially image the demagnified modulated light signals to display for viewing the three dimensional image produced by the demagnified output; and
   e) vertical scanning optics for vertically positioning the output of the modulator in the three-dimensional image.

40. A holographic display system comprising
   a) a laser light source providing laser light signals;
   b) a data processing system providing electrical signals that encode a hologram;
   c) an acousto-optic modulator converting the electrical signals into corresponding acoustic signals and generating a diffraction pattern correlating to the hologram using the acoustic signals such that a three dimensional holographic image is generated by the laser light signals as they pass through the modulator;
   d) a demagnifier for demagnifying the holographic image generated by the acoustic-optic modulator;
   e) optics displaying the demagnified holographic image light signals from the modulator, the displayed holographic image being an aerial image for viewing of a three dimensional image; and
   f) vertical scanning optics for vertically positioning the output of the modulator in a three-dimensional image.

* * * * *

UNITED STATES PATENT AND TRADEMARK OFFICE
CERTIFICATE OF CORRECTION

PATENT NO. : 5,172,251
DATED : December 15, 1992
INVENTOR(S) : Stephen A. Benton and Joel S. Kollin It is certified that error appears in the above-identified patent and that said Letters Patent is hereby corrected as shown below:

In Claim 4, column 8, line 64, change "modulatpr;" to ---modulator;---.

In Claim 5, column 9, line 8, after the words "a light source," add ---for---.

In Claim 6, column 9, line 27 and line 35, change "acoustic-optic" to ---acousto-optic---.

In Claim 9, column 9, line 51, change "acoustic-optic" to ---acousto-optic---.

In Claim 10, column 10, line 19, change "acousto optic" to ---acousto-optic---.

Signed and Sealed this

Twenty-first Day of December, 1993

Attest:

BRUCE LEHMAN

*Attesting Officer*     *Commissioner of Patents and Trademarks*